Patented Aug. 24, 1954

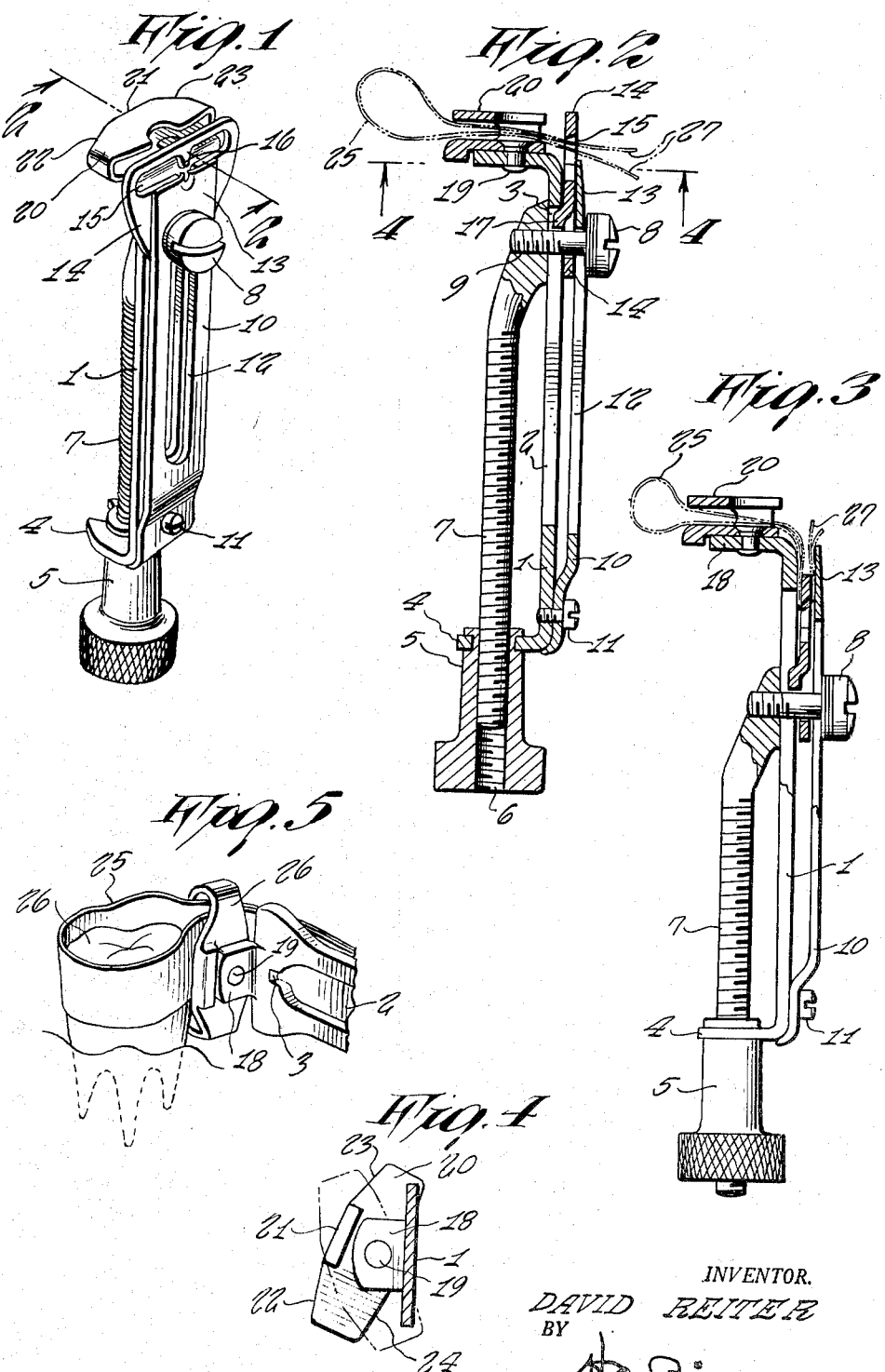

2,686,970

UNITED STATES PATENT OFFICE 2,686,970

RETAINER FOR DENTAL BANDS

David Reiter, Woodside, N. Y.

Application May 15, 1953, Serial No. 355,257

10 Claims. (Cl. 32—63)

1

The present invention is directed to a retainer for dental bands or matrixes, more particularly to a device for holding such bands in position in close contact with a tooth to be filled.

It is among the objects of the present invention to provide a device of the character described, which is automatically adjustable when applied to teeth of various sizes and shapes.

It is also among the objects of the present invention to provide a retainer for bands which is free from interference with adjacent teeth and which does not cause injury to the soft tissues of the mouth, particularly when wide bands are used.

It is further among the objects of the present invention to provide a retainer which is adapted to firmly grip the band and cause it to fit closely around the tooth being treated.

In practicing the present invention there is provided a base having a longitudinal slot therein with a carriage fitting into the slot and adapted to be propelled along said slot by a bolt and nut arrangement. Mounted on the carriage is a holder plate adapted to oscillate, and having a transverse slot therein for the reception of a dental band. The transverse slot is provided with a tongue or similar projection, which under the conditions of the operation is adapted to contact with the ends of the band and usually to pierce the same and prevent it from slipping after the band is tightened around the tooth.

There is also provided a swivel head, generally in the form of a flat tube, which is mounted on an angular portion of the base. The swivel head is adapted to be alined with the holder plate whereby a band may be threaded through the swivel head and holder plate. The edge of the swivel head opposite said plate is angular, having a plurality of faces, one of which is adapted to bear against the tooth being treated and thus hold the retainer in its proper position. Both the head and the plate are adapted to oscillate with respect to the base so that the retainer can be held in a position where it will not interfere with the operations involved in treating the tooth.

In the accompanying drawing constituting a part hereof and in which like reference characters indicate like parts, Fig. 1 is a perspective view of one form of a retainer for dental bands made in accordance with the present invention;

Fig. 2 is a longitudinal cross-sectional view thereof taken along line 2—2 of Fig. 1, some parts being shown in elevation;

2

Fig. 3 is a view similar to Fig. 2 but showing the retainer in gripping position;

Fig. 4 is a fragmentary enlarged cross-sectional view taken along line 4—4 of Fig. 2, and Fig. 5 is an enlarged fragmentary perspective view of the retainer showing its application to a tooth.

The retainer consists of a base 1 here shown as a flat plate, having a longitudinal slot 2 therein, the end of which terminates in a narrowed portion 3. On the opposite end of base 1 is an angular portion 4 having an opening in which a nut 5 is adapted to rotate. Operating in threaded portion 6 of nut 5 is a bolt 7. A carriage 8 passing through slot 2 has its threaded end 9 secured in the end of bolt 7.

A grip plate 10 has one end secured to base 1 by set screw 11 and has a longitudinal slot 12 in alinement with slot 2 of base 1. The free end 13 of plate 10 is in contact with holder plate 14 mounted for oscillation on the stem of carriage 8. Plate 14 has a transverse slot 15 at the free end thereof and a tongue 16 extends inwardly from the upper edge of slot 15. A projection 17 bent from plate 14 is adapted to operate in slot 2 and is of such width as to fit into end 3 of said slot.

The end 18 of base 1 opposite the nut 5 is bent at approximately right angles to base 1 and by means of pin 19 carries swivel head 20 adapted to oscillate on said pin. The swivel head is in the form of a flattened rectangular tube, the opening of which, as shown in Figs. 1 and 2, is adapted to be alined with transverse slot 15. The edge of swivel head 20 opposite slot 15 has a central flat face 21 and adjacent flat faces 22 and 23 at an obtuse angle to face 21. Swivel head 20 is adapted to oscillate in various positions, as shown at 24 in Fig. 4, depending upon the shape and position of the tooth being treated.

In the operation of the retainer, a strip 25, which is to form the dental band, is doubled up to form a loop which is fitted over a tooth 26 to be treated or filled. The contacting ends 27 of the band are threaded through swivel head 20 and plate 14, as shown in Fig. 2. The band is caused to fit fairly tightly against the tooth by pressure with the fingers. The nut 5 is rotated, drawing bolt 7 downwardly and moving carriage 8 in slot 2. In turn the carriage pulls plate 14 with it, causing ends 27 of band 25 to contact with grip plate 10, folding said ends over as shown in Fig. 3. Simultaneously loop 25 is tightened around tooth 26, causing it to conform with the shape of the tooth, with holder plate 14 oscillating until such positioning of the band results.

Head 20 also oscillates with one of the faces 21, 22 or 23 in contact with the tooth.

There are numerous advantages resulting from the present invention which makes it convenient for the dentist in treating or filling a tooth. The band is held tightly against all of the irregularities of the tooth so that a filling does not project beyond the edge of the tooth, thus avoiding the possibility of decay due to food lodging in an overhanging of a filling.

The mounting of the retainer from the inside, palatally or lingually, holds the band against the tooth with the swivel head so that the body of the retainer frees itself from the front teeth, thus rendering the dentist free to properly conduct the operations without interference from the teeth in front of the one on which the retainer is mounted. The tongue in the slot of the holder plate prevents the free ends of the band from slipping and insures that the band will hold its position on the tooth in spite of pressure applied during the filling of the tooth.

The grip plate holds the free ends of the band so that they are held practically within the retainer, thus making impossible any injury to the soft tissues of the mouth. The swivel head activates the oscillating holder plate so that it turns automatically in the proper direction to compensate for the smaller circumference around the cervical area of the tooth. Any of the three flat faces of the swivel head may be used to mount and hold the band against the tooth anatomically, as a result of which less tension is needed to adapt a steel band to the tooth. Less force is required to turn nut 5, which tensions the band around the tooth.

The threading of the folded band into the retainer may be accomplished under various conditions, one of the advantages of the present retainer being that the dentist may first fold the band around the tooth to be treated and then adjust the retainer thereon. Wide bands as well as narrow bands may be used in a single instrument. When a narrow band is used, the holder plate moves at an angle to the base and causes the band to conform with the shape of the tooth. Wide bands may be used without injury to the gums. The projection on the holder plate guides said plate when the projection is in slot 3, thus alining opening 15 with the swivel head.

Although the invention has been described setting forth a single specific embodiment thereof, various changes in the shape and character of the several elements may be made within the spirit of the invention. Any suitable materials may be used for various parts of the structure as well as for the band itself. These and other changes may be made without departing from the principles herein set forth, and the invention is to be broadly construed and not to be limited except by the character of the claims appended hereto.

I claim:

1. A holder for dental bands comprising a base having a longitudinal slot therein, a carriage slidably mounted in said slot, means for shifting said carriage, a holder plate mounted for oscillation on said carriage and having a transverse slot for the reception of a band, a tongue in said transverse slot adapted to contact said band, and means for gripping said band.

2. A holder for dental bands comprising a base having a longitudinal slot therein, a carriage slidably mounted in said slot, means for shifting said carriage, a holder plate mounted for oscillation on said carriage and having a transverse slot for the reception of a band, a swivel head on one end of said base and having a slot adapted to aline with said transverse slot, and means for gripping said band.

3. A holder for dental bands comprising a base having a longitudinal slot therein, a carriage slidably mounted in said slot, means for shifting said carriage, a holder plate mounted for oscillation on said carriage and having a transverse slot for the reception of a band, a swivel head on one end of said base and having a slot adapted to aline with said transverse slot, and means for gripping said band, the end of said head opposite to said holder plate having a plurality of flat faces at an obtuse angle to each other.

4. A holder for dental bands comprising a base having a longitudinal slot therein, a carriage slidably mounted in said slot, means for shifting said carriage, a holder plate mounted for oscillation on said carriage and having a transverse slot for the reception of a band, a projection on said holder plate extending into said longitudinal slot, and means for gripping said band.

5. A holder for dental bands comprising a base having a longitudinal slot therein, a carriage slidably mounted in said slot, means for shifting said carriage, a holder plate mounted for oscillation on said carriage and having a transverse slot for the reception of a band, one end of said longitudinal slot being substantially narrower than the principal portion of said slot and a projection on said holder plate adapted to extend into said narrower end, and means for gripping said band.

6. A holder for dental bands comprising a base having a longitudinal slot therein, a carriage slidably mounted in said slot, means for shifting said carriage, a holder plate mounted for oscillation on said carriage and having a transverse slot for the reception of a band, a grip plate secured to said base and having one end adjcent to said holder plate and adapted to cover said transverse slot, and means for gripping said band.

7. A holder for dental bands comprising a base having a longitudinal slot therein, a carriage slidably mounted in said slot, means for shifting said carriage, a holder plate mounted for oscillation on said carriage and having a transverse slot for the reception of a band, the end of said base adjacent said holder plate having a transverse extension, a swivel head on said extension and having a slot adapted to aline with said transverse slot, and means for gripping said band.

8. A holder for dental bands comprising a base having a longitudinal slot therein, a carriage slidably mounted in said slot, means for shifting said carriage, a holder plate mounted for oscillation on said carriage and having a transverse slot for the reception of a band, a swivel head on one end of said base and having a slot adapted to aline with said transverse slot, and means for gripping said band, the end of said head opposite to said holder plate being angular.

9. A holder for dental bands comprising a base having a longitudinal slot therein, a carriage slidably mounted in said slot, means for shifting said carriage, a holder plate mounted for oscillation on said carriage and having a transverse slot for the reception of a band, a grip plate secured to said base and having one end adjacent to said holder plate and adapted to cover said transverse slot, and means for gripping said band, said grip plate having a longitudinal slot, said carriage being slidably mounted in said grip plate slot.

10. A holder for dental bands comprising a base having a longitudinal slot therein, a carriage slidably mounted in said slot, means for shifting said carriage, a holder plate mounted for oscillation on said carriage and having a transverse slot for the reception of a band, a grip plate secured to said base and having one end adjacent to said holder plate and adapted to cover said transverse slot, and means for gripping said band, said grip plate having a longitudinal slot, said carriage being slidably mounted in said grip plate slot, and said holder plate being located between said base and said grip plate.

References Cited in the file of this patent

UNITED STATES PATENTS

| Number | Name | Date |
| --- | --- | --- |
| 2,374,750 | Ivory | May 1, 1945 |
| 2,572,198 | Reiter | Oct. 23, 1951 |